United States Patent
Kosaka et al.

(10) Patent No.: US 11,970,213 B2
(45) Date of Patent: Apr. 30, 2024

(54) REINFORCEMENT FOR A VEHICLE STRUCTURAL MEMBER

(71) Applicants: TOYODA IRON WORKS CO., LTD., Toyota (JP); TOYOTA JIDOSHA KABUSHIKI KAISHA, Toyota (JP)

(72) Inventors: Hiroyasu Kosaka, Toyota (JP); Daisuke Teramoto, Toyota (JP); Masanori Izumoto, Hino (JP); Katsuya Igarashi, Hino (JP)

(73) Assignee: TOYODA IRON WORKS CO., LTD., Toyota (JP)

( * ) Notice: Subject to any disclaimer, the term of this patent is extended or adjusted under 35 U.S.C. 154(b) by 611 days.

(21) Appl. No.: 17/257,006

(22) PCT Filed: Jun. 28, 2019

(86) PCT No.: PCT/JP2019/025867
§ 371 (c)(1),
(2) Date: Dec. 30, 2020

(87) PCT Pub. No.: WO2020/009033
PCT Pub. Date: Jan. 9, 2020

(65) Prior Publication Data
US 2021/0178445 A1   Jun. 17, 2021

(30) Foreign Application Priority Data

Jul. 2, 2018 (JP) .................................. 2018-125840

(51) Int. Cl.
*B62D 25/04* (2006.01)
*B23K 26/22* (2006.01)
(Continued)

(52) U.S. Cl.
CPC .............. *B62D 25/04* (2013.01); *B23K 26/22* (2013.01); *B62D 21/157* (2013.01); *B21D 22/26* (2013.01)

(58) Field of Classification Search
CPC .... B62D 25/04; B62D 21/157; B62D 27/023; B62D 29/007; B62D 25/02; B62D 25/025
(Continued)

(56) References Cited

U.S. PATENT DOCUMENTS 5,671,968 A * 9/1997 Masuda ............... B62D 25/025
                                                    296/210
9,764,766 B2 * 9/2017 Yoshida ............... B62D 21/157
(Continued)

FOREIGN PATENT DOCUMENTS

JP        10-218017 A     8/1998
JP        2010-115674 A   5/2010
(Continued)

OTHER PUBLICATIONS

Extended European Search Report and written opinion, dated Feb. 23, 2022.
(Continued)

*Primary Examiner* — Dennis H Pedder
(74) *Attorney, Agent, or Firm* — Diamantis Law, PLLC

(57) ABSTRACT

A reinforcement, joined by welding to a vehicle structural member having a closed cross section, comprising a curved section at least in part of its length, a top wall having opposite edges, and a pair of lateral walls extending from the edges to form ridge lines, wherein the top wall and the lateral walls form a U-shaped cross section. The lateral wall includes a base surface and a plurality of welding projections at intervals along its length, each welding projection having a raised surface for welding. Each welding projection is raised from the base surface of the lateral wall toward the vehicle structural member. The lateral wall further includes a bead between the welding projections within a curved section to prevent or suppress wrinkles from forming during press forming. The bead is raised from the base surface of the lateral wall toward the vehicle structural member.

20 Claims, 7 Drawing Sheets

(51) Int. Cl.
  *B62D 21/15*    (2006.01)
  *B21D 22/26*    (2006.01)
(58) Field of Classification Search
  USPC ..... 296/193.06, 29, 30, 203.03, 209, 187.12
  See application file for complete search history.

(56) References Cited

U.S. PATENT DOCUMENTS

| | | |
|---|---|---|
| 2014/0028056 A1 | 1/2014 | Motor |
| 2015/0273563 A1 | 10/2015 | Miyagi et al. |
| 2015/0360725 A1 | 12/2015 | Yoshida |
| 2016/0264183 A1 | 9/2016 | Saito |

FOREIGN PATENT DOCUMENTS

| | | | |
|---|---|---|---|
| JP | 2013-220807 A | 10/2013 |
| JP | 5614514 B2 | 10/2014 |
| JP | 2017-197191 A | 11/2017 |

OTHER PUBLICATIONS

International Bureau English translation of international preliminary report on patentability for PCT/JP2019/025867; dated Jan. 14, 2021.
Sep. 24, 2019 International Search Report issued in International Patent Application No. PCT/JP2019/025867.

* cited by examiner

REINFORCEMENT FOR A VEHICLE STRUCTURAL MEMBER

CROSS-REFERENCE TO RELATED APPLICATIONS

The present application is a U.S. National Phase entry of, and claims priority to, PCT Application No. PCT/JP2019/025867, filed Jun. 28, 2019, which claims priority to Japanese Patent Application No. 2018-125840, filed Jul. 2, 2018, both of which are incorporated herein by reference in their entireties for all purposes.

BACKGROUND

The present disclosure relates to a reinforcement for a vehicle structural member.

A vehicle, such as an automobile, typically includes pillars on its sides, serving as structural members. Such pillars include a front pillar, commonly referred to as an A-pillar, a center pillar, commonly referred to as a B-pillar, and a rear pillar, commonly referred to as a C-pillar. These pillars are arranged from the front to the rear of the automobile. Among these pillars, the center pillar is required to have a structural strength sufficient enough to resist a side collision with an automobile. The center pillar is therefore provided with a reinforcement, which may be called a hinge reinforcement, to reinforce its strength.

The center pillar is elongated and has a closed cross section, the closed cross section comprising an outer panel having a hat-shaped cross section and a flat inner panel. A hinge reinforcement is arranged within the closed cross section and is joined to the outer panel by welding, or other means, to reinforce the center pillar.

Since the hinge reinforcement is placed inside the closed cross section of the center pillar, it is elongated and has a U-shaped cross section, in accordance with the inner surfaces of the outer panel of the hat-shaped cross section. The configuration of the U-shaped cross section comprises a central top wall and lateral walls extending from the opposite edges of the top wall, bent to form ridge lines.

The center pillar and the hinge reinforcement each have a curved section in part of their lengths, and are oriented in the vehicle such that they are convex toward outside of the vehicle. The hinge reinforcement is formed by pressing. A single steel sheet is bent, by pressing, into a U-shaped cross section (e.g., see JP 2010-115674 A).

Another technique in this field is disclosed in Japanese Patent Application Laid-Open No. 10-218017.

SUMMARY

The material used for the hinge reinforcement tends to have a higher strength, due to the recent demand for improved performance against side impact. Wrinkles, once formed during a press forming when a high-strength material is used, are difficult to be smoothed and flattened during the same sequence of the forming processes. In other words, when the material strength is not high, any wrinkles formed during a forming process can be smoothed and flattened at the final forming stage in the same process sequence. However, in the case of a high-strength material, once wrinkles occur, it is difficult to smooth the wrinkles in the subsequent press forming process in the same process sequence because of the high strength of the material. Furthermore, it is troublesome and difficult to remove wrinkles by other means after press forming.

In particular, wrinkles formed during press forming are likely to occur in the lateral wall within the curved section of the U-shaped hinge reinforcement. Since the hinge reinforcement is to be welded to the center pillar at the lateral walls, it is necessary to accurately form the lateral wall without any wrinkles. It should be noted that the wrinkles considered a problem herein are out-of-plane undulation in the steel sheet.

As described above, even when a reinforcement having a U-shaped cross section is press formed using a high-strength material, it is desired to prevent or suppress the occurrence of wrinkles in the curved section of the lateral wall of the reinforcement.

One aspect of the present disclosure provides for a reinforcement for a vehicle structural member, wherein the reinforcement is disposed in the interior space of the vehicle structural member having a closed cross section and is joined by welding to the vehicle structural member. The reinforcement comprises a curved section formed in at least a part of its length, a top wall having opposite edges, and a pair of lateral walls extending from the edges of the top wall so as to form ridge lines therebetween. The top wall and the lateral walls form a U-shaped cross section. At least one of the lateral walls includes a base surface, and a plurality of welding projections positioned at intervals along its length. Each welding projection has a raised surface for the welding. Each welding projection is raised from the base surface of the lateral wall toward the vehicle structural member. This lateral wall further includes a bead between the welding projections positioned within the curved section. The bead is configured to prevent or suppress wrinkles from forming during a press forming process. The bead is raised from the base surface of the lateral wall toward the vehicle structural member.

In some embodiments, a height of the bead, measured from the base surface, is smaller than a height of the welding projections, measured from the base surface.

In some embodiments, the bead and the welding projections are arranged at such intervals that a rounded transition from the bead to the base surface does not overlap a rounded transition from the welding projection to the base surface.

In some embodiments, the bead extends from an open side edge of the lateral wall toward the ridge line. The bead has a length smaller than a width of the lateral wall.

In some embodiments, the welding projections arranged within the curved section of the lateral wall have a height from the base surface, the height being zero at the ridge line and increasing toward the raised surface.

In some embodiments, wrinkles are prevented or suppressed from occurring in the lateral wall in the curved section of the reinforcement even when the reinforcement with a U-shaped cross section is press formed from a high-strength material.

DETAILED DESCRIPTION

Embodiments of the present invention will be described below with reference to the drawings. In one embodiment, the described vehicle structural member is a center pillar, which is one of the pillars of a side of an automobile or other vehicle. Also in this embodiment, the described reinforcement is a hinge reinforcement that reinforces the center pillar. The directions indicated in some drawings are with reference to an automobile or other vehicle in the normal position: arrow FR indicates the forward direction, arrow UP the upward direction, and arrow IN the inward direction of the vehicle. In the following description, directional terms are based on these directions.

Figure 1:
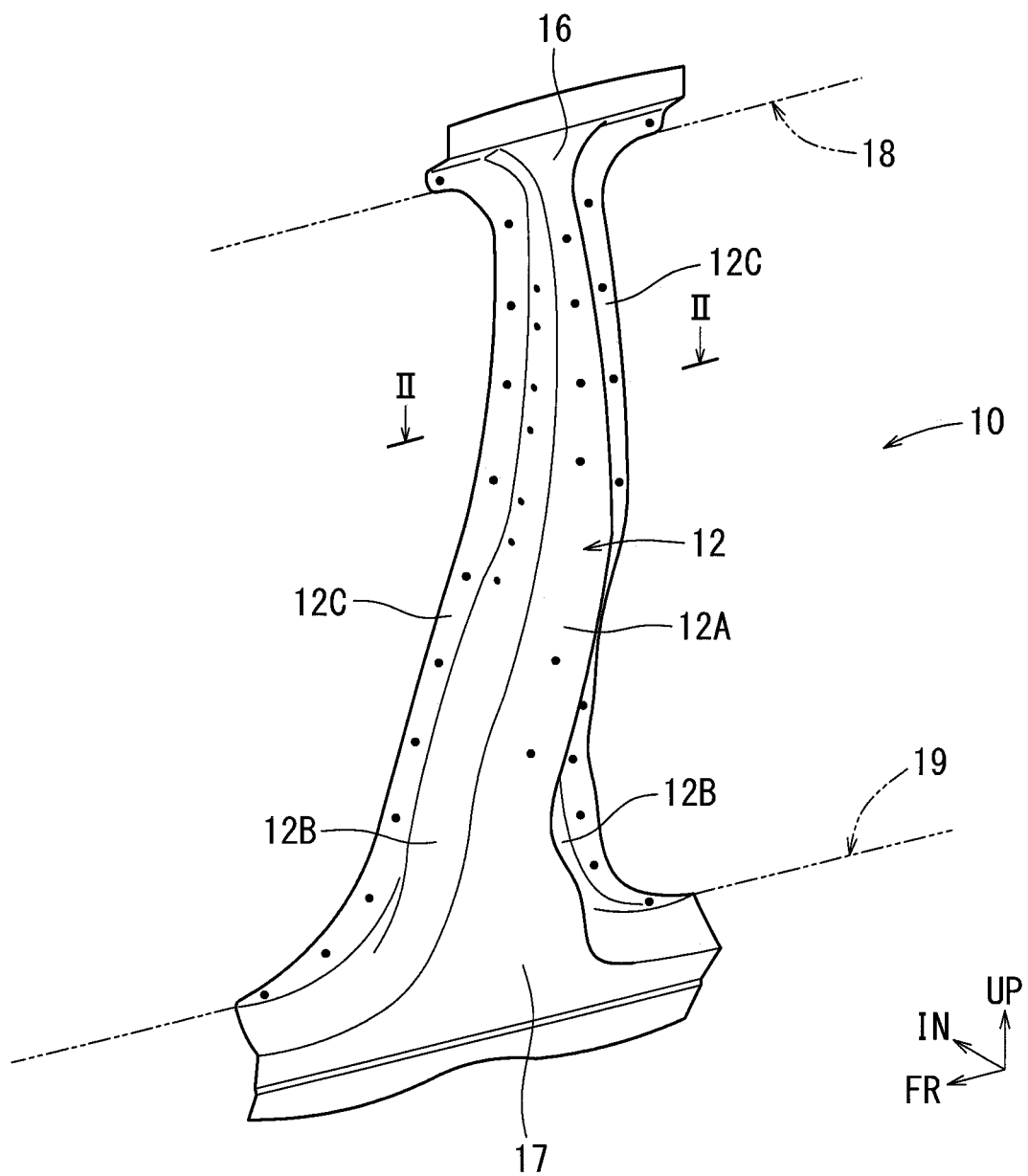
FIG. 1 is an overall view of an example of a center pillar arranged on a side of an automobile or other vehicle.
Figure 2:
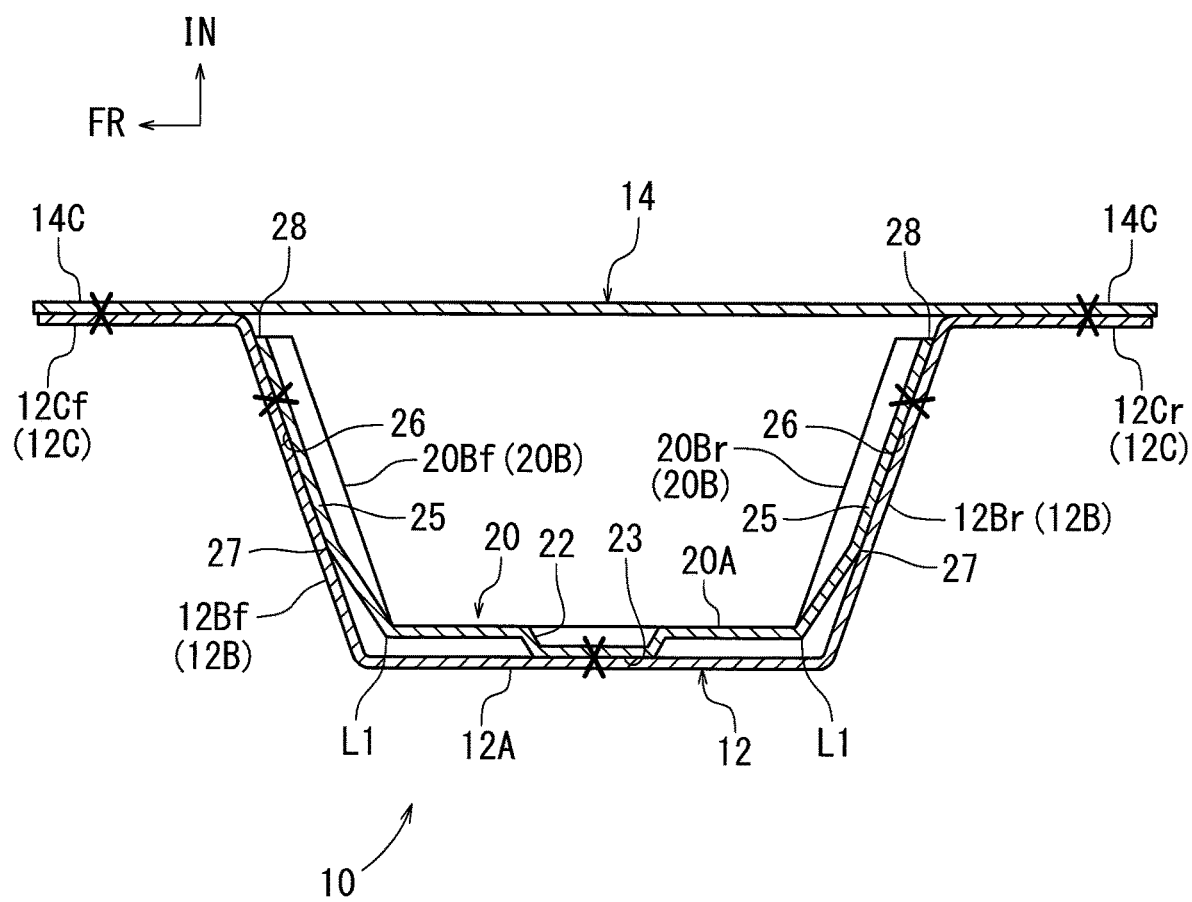
FIG. 2 is a cross-sectional view of the center pillar of FIG. 1, taken along line II-II.

FIG. 1 shows a general structure of a center pillar 10 for an automobile or other vehicle, and FIG. 2 shows a cross section of the center pillar 10 of FIG. 1 taken along line II-II. The center pillar 10 shown in FIG. 1 is that of the left side of the vehicle in the traveling direction. As described in the background section above, the sides of a vehicle have pillars serving as vehicle structural members. The pillars include a front pillar (not shown), commonly called an A pillar, a center pillar 10, commonly called a B pillar, and a rear pillar (not shown), commonly called a C pillar. These pillars may be arranged in this order, starting from the front of the automobile. The strength of the center pillar 10, among these pillars, is considered more important because of the need for countermeasures against a side collision with an automobile. Therefore, as shown in FIG. 2, the center pillar 10 includes a reinforcement, which may be called a hinge reinforcement 20, to reinforce its strength. In one embodiment, a high-strength steel sheet may be used, as will be described later, to satisfy the recent demand for even higher strength.

As shown in FIG. 1 and FIG. 2, the center pillar 10 includes a long outer panel 12 that forms the vehicle outer side of the center pillar 10 and an inner panel 14 that forms the vehicle inner side of the center pillar 10. The center pillar 10 further includes a hinge reinforcement 20 arranged inside the outer panel 12.

The outer panel 12 has a hat-shaped cross section, open toward the inside of the vehicle, and includes a top wall 12A, lateral walls 12B, and flanges 12C. The top wall 12A is situated on the vehicle outer side (lower side as seen in FIG. 2). From opposite edges of the top wall 12A extend the left and right lateral walls 12B, extending toward the inside of the vehicle (upward as seen in FIG. 2). These lateral walls 12B form ridge lines. The left and right lateral walls 12B are inclined such that the distance between them increases toward inside of the vehicle (upward as seen in FIG. 2). A flange 12C extends continuously from the edge of each of the lateral walls 12B on the vehicle inner side (upper side in FIG. 2). The flanges 12C extend in opposite directions. The flanges 12C extend parallel to the top wall 12A.

When it is needed to distinguish between the symmetrically arranged lateral walls 12B and flanges 12C in this disclosure, those on the vehicle rear side (the right side in FIG. 2) will be denoted by their reference symbols followed by an "r," and those on the vehicle front side (left side in FIG. 2) by their reference symbols followed by an "f."

As shown in FIG. 2, the inner panel 14 is generally flat and includes flanges 14C extending outward from its edges on the vehicle forward and rearward side (the left and right sides as seen in FIG. 2). The flanges 14C of the inner panel 14 are held against the flanges 12C of the outer panel 12 in the vehicle width direction and joined thereto, for instance by spot welding, to form a closed cross section therebetween. The filled circles in FIG. 1 and the crosses in FIG. 2 indicate welding spots. The welding method is not limited to spot welding, but may instead be other welding methods, such as laser welding.

As shown in FIG. 1, the elongated center pillar 10 extends vertically on the vehicle. The center pillar 10 is gently curved, such that it is convex toward the outside of the vehicle at a height slightly below the middle of its length. The center pillar 10 is inclined such that its upper end is rearward relative to its lower end, in the vehicle traveling direction.

As shown in FIGS. 1 and 2, the elongated center pillar 10 has a closed cross-section and, thus, defines an interior space. As shown in FIG. 1, the center pillar 10 is joined to the roof side rail 18 via a generally T-shaped attachment portion 16 at the upper end of the outer panel 12. The center pillar 10 is also joined to the side sill 19 via another generally T-shaped attachment portion 17 at the lower end of the outer panel 12.

The outer panel 12 may be made of a sheet of steel having a tensile strength of, for example, 1180 MPa or more. In one embodiment, a high-tensile steel sheet having a tensile strength of 1470 MPa can be used. The outer panel 12 may be formed by room temperature or cold pressing, or hot stamping. The inner panel 14 may be made of a sheet of steel having a tensile strength equal to or lower than that of the outer panel 12. In a particular embodiment, it may be made of a steel sheet having a tensile strength of 590 MPa. The inner panel 14 is formed by cold pressing.

The hinge reinforcement 20 disposed in the interior space of the center pillar 10 will now be described. As best shown in FIG. 2, the hinge reinforcement 20 is disposed along the inner surface of the outer panel 12 of the center pillar 10. The hinge reinforcement 20 includes a top wall 20A and lateral walls 20B.

To be arranged along the inner surface of the outer panel 12 of the center pillar 10 as described above, the hinge reinforcement 20 has a generally U-shaped cross section. The top wall 20A of the hinge reinforcement 20 is positioned along the inner side of the top wall 12A of the outer panel 12. The two lateral walls 20B are positioned along the inner sides of the lateral walls 12B of the outer panel 12. The two lateral walls 20B extend continuously from the opposite edges of the top wall 20A toward the inside of the vehicle (upward as seen in FIG. 2), forming ridge lines L1. The lateral walls 20B of the hinge reinforcement 20, like the lateral walls 12B of the outer panel 12, are inclined such that the distance between them widens toward the inside of the vehicle (upward in FIG. 2).

The above described U-shaped cross section of the hinge reinforcement 20 comprises a central top wall 20A and two lateral walls 20B extending from the opposite edges of the top wall 20A, thereby forming the ridge lines L1.

As with the outer panel 12, when the symmetrically arranged left and right lateral walls 20B of the hinge reinforcement 20 need to be distinguished from each other in this disclosure, the one on the vehicle rearward side (the right side in FIG. 2) will be denoted by its reference symbol followed by an "r," and the one on the vehicle front side (the left side in FIG. 2) by its reference symbol followed by an "f."

Figure 3:
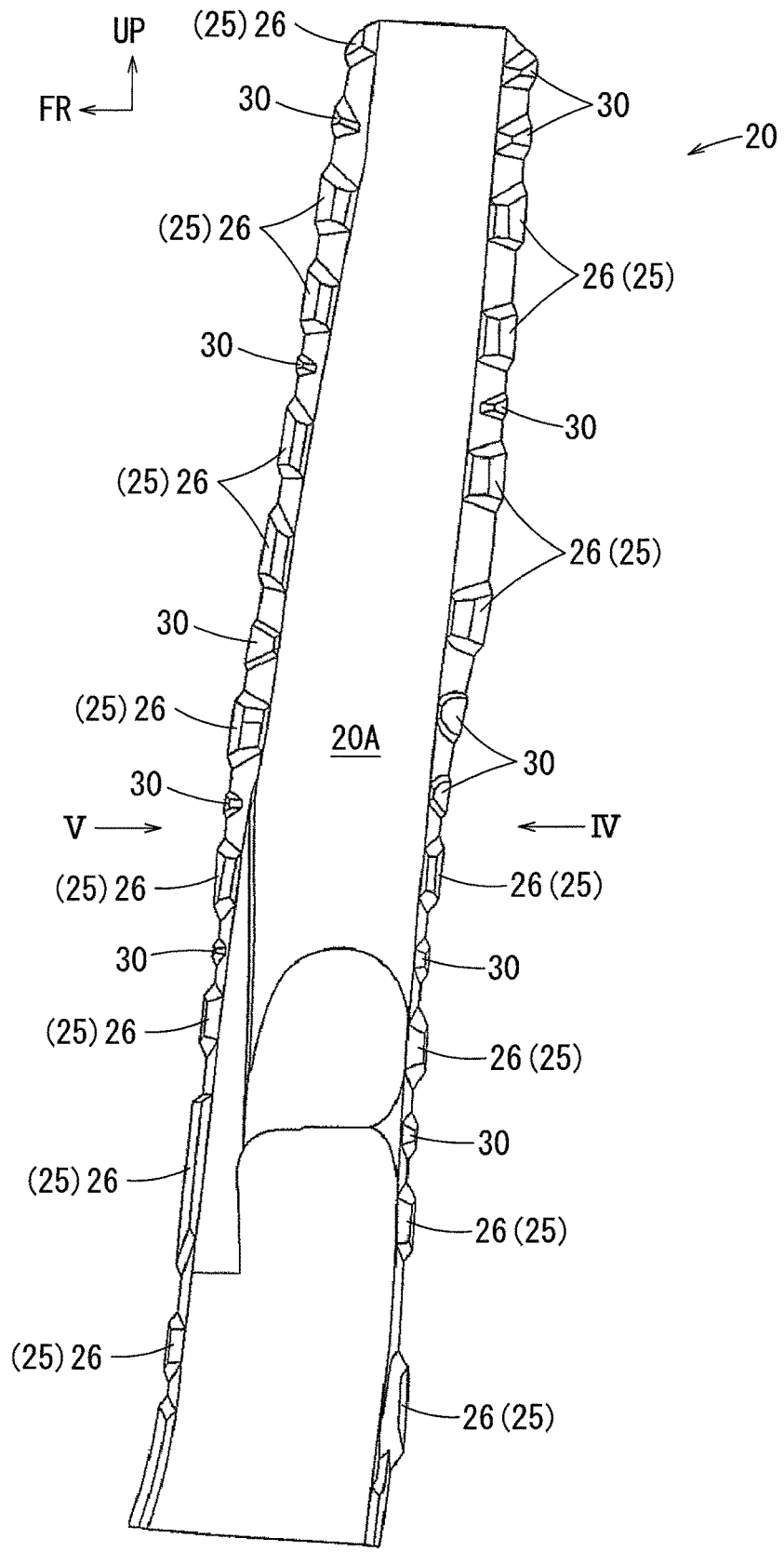
FIG. 3 is a front view of a top wall of a hinge reinforcement, as seen from the inside of the vehicle.
Figure 4:
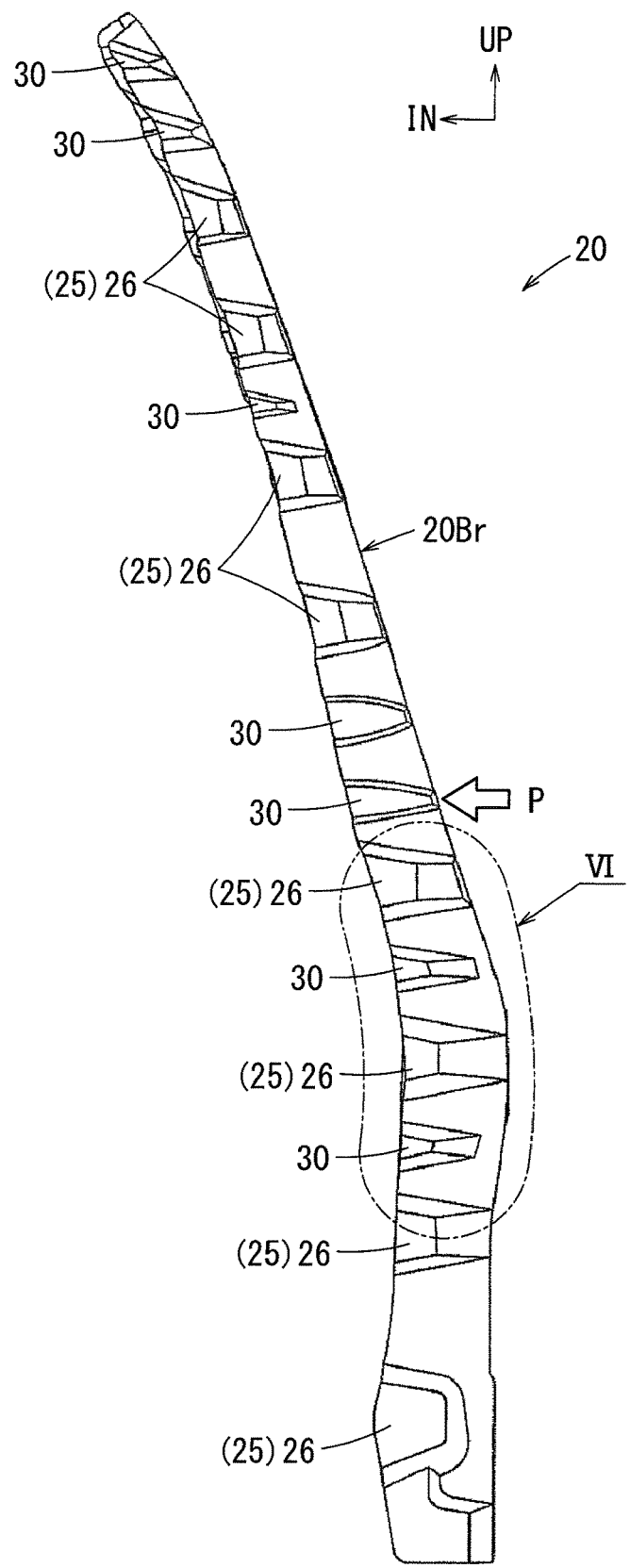
FIG. 4 is a side view of a lateral wall on the vehicle rearward side when the hinge reinforcement of FIG. 3 is viewed from the direction of arrow IV.
Figure 5:
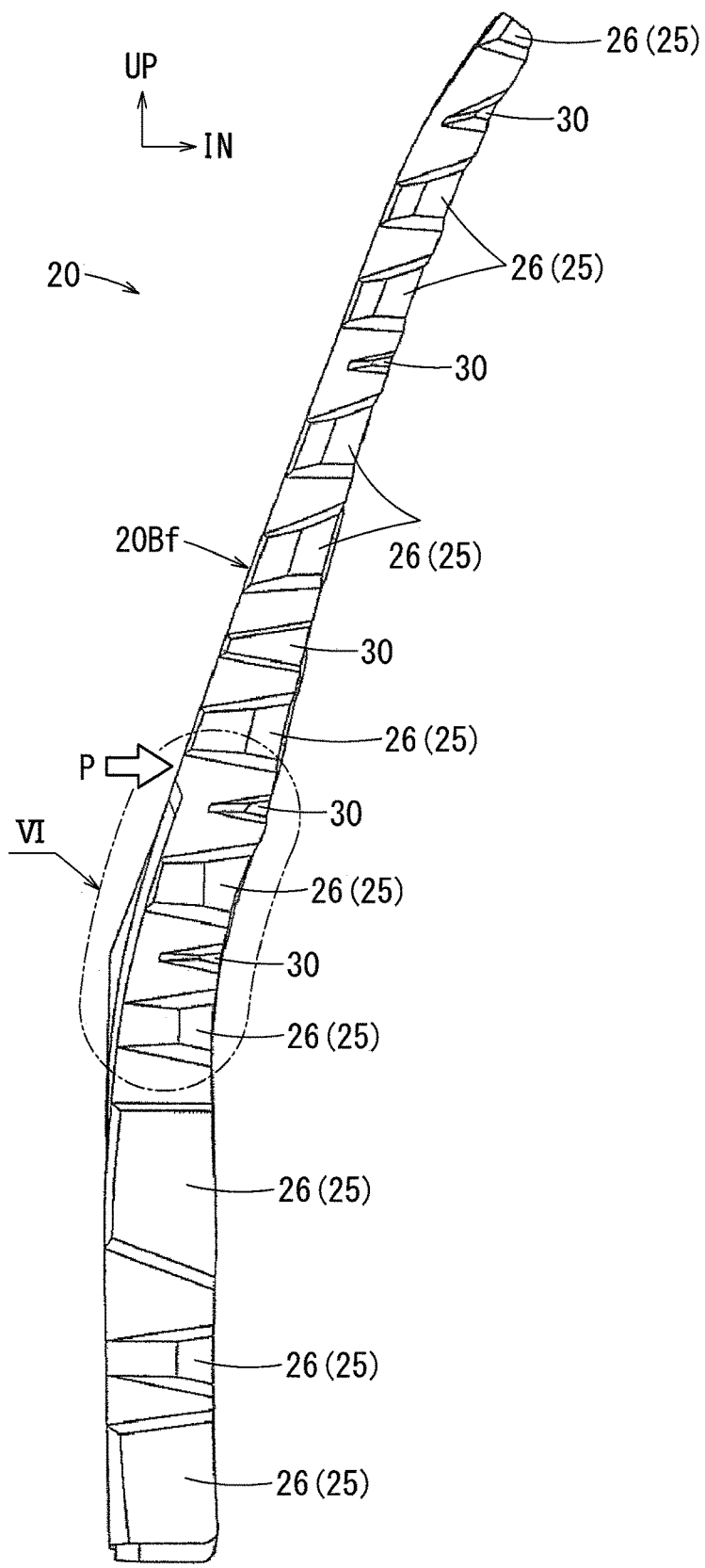
FIG. 5 is a side view of the lateral wall on the vehicle forward side when the hinge reinforcement of FIG. 3 is viewed from the direction of arrow V.

FIGS. 3 to 5 show the entire hinge reinforcement 20 of this embodiment. FIG. 3 shows the top wall 20A of the hinge reinforcement 20 as viewed from the inside of the vehicle. FIG. 4 shows the lateral wall 20Br on the vehicle rearward side when the hinge reinforcement 20 of FIG. 3 is viewed from the direction of the arrow IV shown in FIG. 3. FIG. 5 shows a lateral wall 20Bf on the vehicle forward side when the hinge reinforcement 20 of FIG. 3 is viewed from the direction of the arrow V shown in FIG. 3. As shown in these figures, the hinge reinforcement 20 is elongated. As shown in FIGS. 4 and 5, the hinge reinforcement 20 is gently curved toward the outside of the vehicle. That is, the hinge reinforcement 20 has a curved section in part of its length. In the hinge reinforcement 20 shown in FIGS. 4 and 5, for example, the indicated region VI is the curved section.

The hinge reinforcement 20 is formed by pressing. To improve the performance against side impact collisions, a high-tensile steel sheet may be used as the material for press forming. The tensile strength is typically 980 MPa or more. In a particular embodiment, a high tensile strength steel sheet of 1180 MPa can be used. The thickness of the steel sheet to be pressed may be, for example, about 1-2 mm. A single high-tensile steel sheet is press formed by normal temperature pressing, cold pressing, or hot stamping. The white arrow P in FIGS. 4 and 5 indicates the pressing direction of the press forming process. When the high-tensile steel sheet is press formed as described above, the lateral walls 20B, which are to be subjected to bending, tend to have excess material. This excess material could potentially result in wrinkles. In particular, wrinkles are likely to occur in the lateral wall 20B within the curved section of the hinge reinforcement 20.

Although not shown in FIGS. 3 to 5, but as shown in FIG. 2, the top wall 20A of the hinge reinforcement 20 is joined by spot welding to the inner surface of the top wall 12A of the outer panel 12. For this attachment purpose, the top wall 20A of the hinge reinforcement 20 includes welding projections 22. Each welding projection 22 is raised toward outside of the vehicle by a height (e.g. 2 mm) to form a raised welding surface 23. The welding projections 22 are scattered vertically.

The outer surface of the welding projection 22, i.e. the raised welding surface 23, is planar, as shown in FIG. 2, in order to secure the strength of the spot welding joint with the top wall 12A of the outer panel 12. While not clearly seen in FIG. 2, in one embodiment, the shape of each welding projection 22 may be semicircular or circular. However, in other embodiments, it may take various other shapes, such as a rectangle, triangle, ellipsis, or hexagon.

The outer panel 12 and the hinge reinforcement 20 may also be welded between the lateral walls 12B of the outer panel 12 and the lateral walls 20B of the hinge reinforcement 20, for instance at the spots indicated by crosses in FIG. 2. Accordingly, the lateral walls 20Br, 20Bf of the hinge reinforcement 20 shown in FIGS. 4 and 5 each include a plurality of welding projections 25. These plurality of welding projections 25 provide for raised welding surfaces 26. Each welding projection 25 is raised toward the lateral walls 12B of the outer panel 12 and are scattered along the vertical. The raised welding surfaces 26 of the hinge reinforcement 20 are spot welded to the inner surface of the lateral wall 12B of the outer panel 12.

Figure 6:
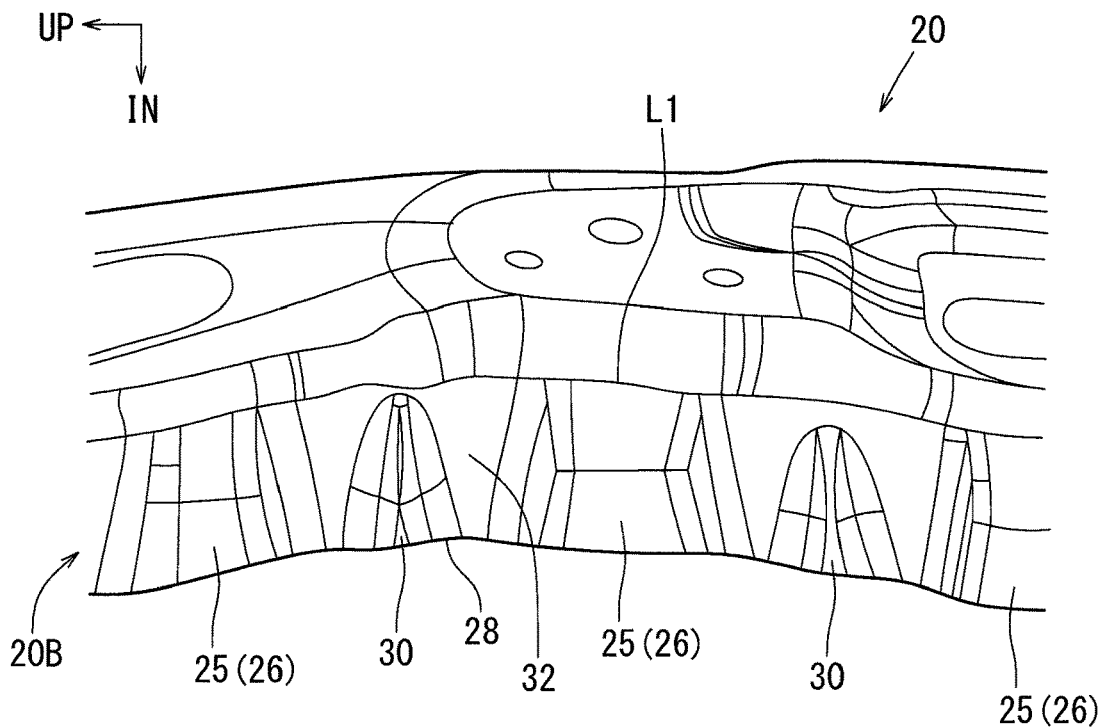
FIG. 6 is an enlarged perspective view of region VI of the hinge reinforcement of FIG. 4.

FIG. 6 is an enlarged view of the lateral wall 20Br within region VI shown in FIG. 4. This region VI is a curved section of the hinge reinforcement 20. The opposite lateral wall 20Bf within region VI shown in FIG. 5 may have a similar configuration to that shown in FIG. 4. As shown in FIG. 6, the welding projections 25 and anti-wrinkle beads 30 are alternately arranged along the lateral wall 20B within the curved section of the hinge reinforcement 20. More specifically, the welding projections 25 are arranged at intervals over the entire length, and, within the curved section, an anti-wrinkle bead 30 is arranged between two welding projections 25.

The welding projections 25 provide a site for welding the hinge reinforcement 20 to the outer panel 12, as described above. The welding projections 25 have the additional benefit of preventing or suppressing wrinkles from forming in the lateral wall 20B when press forming the hinge reinforcement 20. In contrast, the anti-wrinkle beads 30 are designed chiefly to prevent or suppress the wrinkles from occurring during the press forming. Therefore, the anti-wrinkle beads 30 are arranged within the curved sections, where wrinkles are more likely to occur during the press forming.

Figure 7:
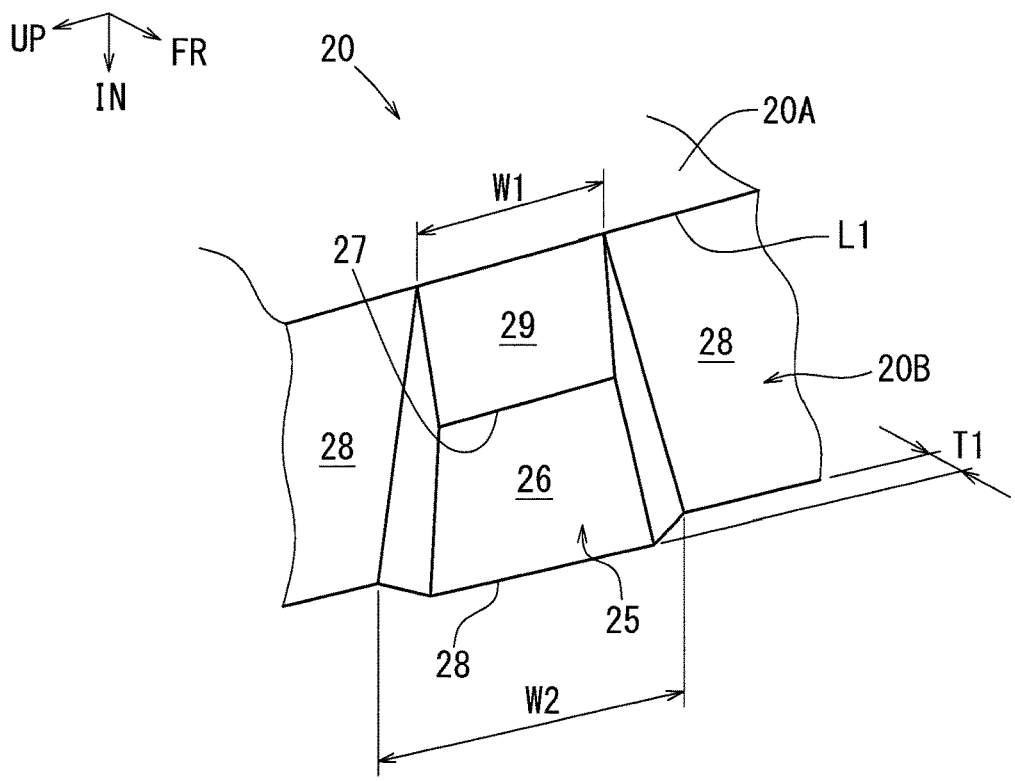
FIG. 7 is an enlarged perspective view of a welding projection in the hinge reinforcement of FIG. 6.
Figure 8:
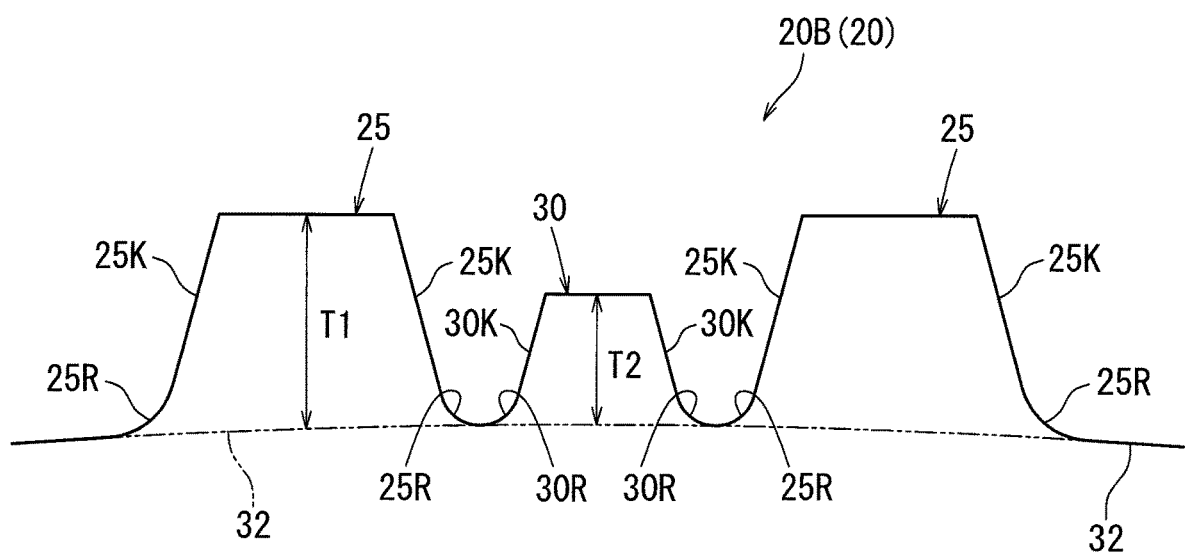
FIG. 8 is a view of a connection between the welding projections of the lateral wall of the hinge reinforcement and an anti-wrinkle bead as viewed from an edge, in which the thickness is omitted and the height is exaggerated.

FIGS. 7 and 8 schematically show the welding projections 25 in the lateral wall 20B of the hinge reinforcement 20. In particular, FIG. 8 is a view of the lateral wall 20B from the edge, with the thickness being omitted and the height being exaggerated. The welding projections 25 are raised outward from a base surface 32 of the lateral wall 20B by a height T1. In a particular embodiment, this height T1 may be 4 mm. As shown in FIGS. 2 and 7, the welding projection 25 extends from the ridge line L1, which is formed between the lateral wall 20B and the top wall 20A, to the edge of the lateral wall 20B that faces inside of the vehicle. The welding projections 25 may be formed over the entire width of the lateral wall 20B.

Each welding projection 25 has a trapezoidal front shape, with a width W1 at the edge on the ridge line L1 being narrower than a width W2 at the edge toward the vehicle inner side. The welding projection 25 includes an inclined surface 29 adjacent the ridge line L1 and a raised welding surface 26 adjacent the edge 28. The boundary 27 between the inclined surface 29 and the raised welding surface 26 is shown as a line.

The inclined surface 29 of the welding projection 25 is adjacent to the ridge line L1 and rises to the welding surface 26. That is, the height of the inclined surface 29, the height from the base surface 32, is zero at the ridge L1 and gradually increases toward the boundary 27 with the raised welding surface 26. This helps prevent cracks from occurring because of shrinkage during press forming.

The raised welding surface 26 is formed flat, as shown in FIGS. 2 and 7, in order to secure the strength of the spot welding joint with the lateral wall 12B of the outer panel 12. Specifically, the raised welding surface 26 has a sideways trapezoidal front shape, and is flat between the boundary 27 with the inclined surface 29 and the edge 28 of the lateral wall 20B on the vehicle inner side. The width of the raised welding surface 26 at the boundary 27 is narrower than the width of the raised welding surface 26 at the edge 28 on the vehicle inner side.

An embodiment of the anti-wrinkle beads 30 of the hinge reinforcement 20 will now be described. As shown in FIG. 6, the anti-wrinkle bead 30 is situated between two adjacent welding projections 25 of the hinge reinforcement 20, as described above. The locations of the anti-wrinkle beads 30 are within the curved section of the lateral wall 20B. The structure of the anti-wrinkle beads 30 can be generally described as a downsized version of the welding projections 25 described above.

The anti-wrinkle beads 30 of this embodiment have an arched shape, as shown in FIG. 8. The anti-wrinkle beads 30 project from the base surface 32 of the lateral wall 20B in the same direction as the welding projection 25. That is, the anti-wrinkle beads 30 are raised toward the inner surface of the lateral wall 12B of the center pillar 10. The height T2 of the anti-wrinkle beads 30, measured from the base surface 32, is smaller than the height T1 of the welding projections 25. In one embodiment, the height of the anti-wrinkle beads 30 can be about half the height of the welding projections 25, for example, the height T1 of the welding projections 25 can be 4 mm and the height T2 of the anti-wrinkle beads 30 can be 2 mm.

Since the height T2 of the anti-wrinkle beads 30 are smaller than the height T1 of the welding projections 25, the tops of the anti-wrinkle beads 30 may not come into contact with the inner surface of the lateral wall 12B of the outer panel 12. This prevents noise, e.g. that which would otherwise have been generated if the anti-wrinkle beads 30 of the hinge reinforcement 20 contact the inner surface of the lateral wall 12B of the outer panel 12 during traveling of the vehicle.

As shown in FIG. 6, the anti-wrinkle beads 30 extend, along their lengths, in the direction of the width of the lateral wall 20B (vertically as seen in FIG. 6), from the open side edge 28 of the lateral wall 20B of the hinge reinforcement 20 toward the ridge line L1. The length of the anti-wrinkle beads 30 are shorter than the width of the lateral wall 20B. That is, the anti-wrinkle beads 30, in the length direction, does not reach the ridge line L1. The anti-wrinkle beads 30 have an arched shape, in which the height from the base surface 32 decreases and the width narrows toward the ridge line L1. This shape corresponds to the fact that the compression of the lateral wall 20B in the press forming is larger on the vehicle inner side (lower side as seen in FIG. 6) than on the vehicle outer side (upper side). Since wrinkles may be formed during press forming due to excess material due to compression, the shape is designed to accommodate such excess material.

When, as described above, the anti-wrinkle beads 30 have a length smaller than the width of the lateral wall 20B, the space between the adjacent welding projections 25 can be arranged closer to each other. As a result, the number of the welding projections 25 can be increased, if necessary.

As shown in FIG. 8, in one embodiment, both the welding projection 25 and the anti-wrinkle bead 30 of the hinge reinforcement 20 may be arched or trapezoidal, with the slanted sides 25K, 30K continuing to the base surface 32 of the lateral walls 20B. In this case, the slanted sides 25K, 30K and the base surface 32 are connected to the lateral wall 20B through radiused portions 25R, 30R (rounded transition).

The anti-wrinkle bead 30 and the welding projection 25 are arranged at intervals such that the radiused portion 30R of the anti-wrinkle bead 30 and the radiused portion 25R of the welding projection 25 do not overlap each other. In one embodiment, as shown in FIG. 8, the radiused portion 30R of the anti-wrinkle bead 30 and the radiused portion 25R of the welding projection 25 can be continuous, without any interval formed therebetween. This may be a suitable configuration when it is required to arrange adjacent welding projections 25 closer to each, other than as described above. In another embodiment, as shown in FIG. 6, the radiused portion 30R of the anti-wrinkle bead 30 and the radiused portion 25R of the welding projection 25 may be separated by a portion of the base surface 32.

The above-described configuration of the non-overlapping radiused portions 30R, 25R of the anti-wrinkle bead 30 and the welding projection 25 effectively prevents or suppresses the formation of wrinkles, while securing the required strength against collision. For this purpose, it is preferable that the radiused portion 30R of the anti-wrinkle bead 30 and the radiused portion 25R of the welding projection 25 do not overlap each other. For instance, it is preferable that the radiused portions 30R, 25R are positioned in such a way that they are connected to each other through a portion of the base surface 32 of the lateral wall 20B.

Some of the advantages of the embodiments described above will be listed below. The welding projection 25 and the anti-wrinkle bead 30 in the lateral wall 20B of the hinge reinforcement 20 of the above embodiment prevent or suppress the formation of wrinkles in the lateral wall 20B during press forming. Particularly when a high-strength steel sheet is used in the press forming, wrinkles can be effectively prevented or suppressed.

As shown in FIGS. 4 and 5, a plurality of welding projections 25 are formed in the lateral wall 20B of the hinge reinforcement 20 at appropriate intervals and over the entire length. Firstly, the welding projections 25 provide the raised welding surfaces 26, as described above, for welding the hinge reinforcement 20 to the inner surface of the lateral wall 12B of the outer panel 12.

Furthermore, when the high-strength hinge reinforcement 20 is press formed, the welding projections 25 collapse in the longitudinal direction of the hinge reinforcement 20 (the left-right direction in the views of FIGS. 6 to 8) to absorb the longitudinal excess of material in the base surface 32 of the lateral wall 20B. This prevents or suppresses the excess material from forming wrinkles during the press forming process.

As described above, the welding projections 25 prevent or suppresses formation of wrinkles. However, they may be incapable of fully preventing or suppressing the formation of wrinkles in the curved section of the hinge reinforcement 20, which is a region where excess material is more likely to occur. Therefore, as described above, anti-wrinkle beads 30 are included within the curved section in order to prevent or suppress formation of wrinkles due to the excess material. The anti-wrinkle beads 30 are located between the welding projections 25 in the lateral wall 20B within the curved section. As a result, the welding projections 25 and the anti-wrinkle beads 30 together absorb the excess material occurring in the curved section, thereby preventing or suppressing the occurrence of wrinkles. The anti-wrinkle beads 30 are also able to collapse in the longitudinal direction of the hinge reinforcement 20 to absorb the excess material.

It may be noted that during the press forming of the hinge reinforcement 20, the lateral wall 20B in the curved section is stretched along its outer side of curvature and compressed along its inner side of curvature. Since during press forming excess material is caused by the compression, wrinkles are more likely to occur on the inner side of curvature. Therefore, as the press forming moves more toward the inner side of the curvature, the more excess material that needs to be absorbed. The above-described shape of the anti-wrinkle bead 30 corresponds to this tendency during compression and effectively prevents wrinkles. For example, as shown in FIG. 6, the anti-wrinkle bead 30 in the curved section has a width that gradually decreases from the edge of the lateral wall 20B toward the ridge line L1.

A computer-aided engineering (CAE) analysis was performed on the hinge reinforcement 20 having the welding projections 25 and the anti-wrinkle beads 30 in the lateral walls 20B described above. It has been found from the results that a hinge reinforcement 20 thus configured relieves the compressive strain and spring back after the press forming process. The hinge reinforcement used for comparison in the CAE analysis had only the welding projections 25 in the lateral walls 20B; no anti-wrinkle beads 30 were included. The height of the raised welding surfaces 26 of the welding projections 25 of both samples were set to a height T1 of 4 mm. According to an analysis of the results, the maximum longitudinal compressive strain in the lateral walls of the hinge reinforcement with no anti-wrinkle beads was 0.14. However, the maximum longitudinal compressive strain for the hinge reinforcement 20 with the anti-wrinkle beads 30 was 0.12, exhibiting an improvement of 14%. The amount of springback of the lateral wall when press forming a hinge reinforcement according to the conventional configuration was 5.16 mm. However, it was 4.57 mm for the present example, which shows an 11% improvement.

The number of the anti-wrinkle beads 30 between two welding projections 25 in the lateral wall 20B as described above is not limited to one. In other embodiments, the number may be two or more. The number may be determined according to the curvature of the curved section of the lateral wall 20B.

The anti-wrinkle beads 30 are effective when included in the curved section of the hinge reinforcement 20. In another embodiment, they may also be included in any non-curved section, if necessary.

The anti-wrinkle beads 30 are not limited to the above described arched or trapezoidal shapes having the apex as shown in the drawings. In another embodiment, their shapes may be of an inverted V, or any other shape into which the base surface can be compressed to prevent wrinkles.

In the above embodiment, a high-strength material is used as the material for the hinge reinforcement 20, in view of its performance against side collisions. However, in another embodiment, this feature can be applied to a reinforcement that requires wrinkle prevention during press forming, regardless of the strength of the material.

In the above embodiment, the vehicle structural member is a center pillar 10 and the reinforcement is a hinge reinforcement 20 that reinforces the center pillar 10. However, in another embodiment, they may be another kind of pillar and reinforcement. In yet another embodiment, they may be a vehicle structural member other than a pillar and reinforcement.

In the embodiments described above, the lateral wall includes a plurality of welding projections at intervals along its length, each having raised surfaces for welding. Each welding projection was described as being raised from the base surface of the lateral wall toward the vehicle structural member. As a result, the welding projection absorbs the excess material in the base surface of the lateral wall during the press forming, thereby preventing or suppressing the formation of wrinkles in the lateral wall.

In the above embodiments, the lateral wall includes a bead between the welding projections within the curved section, thereby further preventing or suppressing the formation of wrinkles during press forming. The bead was described above as being raised from the base surface of the lateral wall toward the vehicle structural member. The curved section is a region where wrinkles could easily occur during press forming. Both the above-mentioned welding projections and the anti-wrinkle beads absorb the excess material in the curved section, where wrinkles are more likely to occur. Accordingly, the reliably preventing or suppressing formation of wrinkles in the curved section is increased. This allows for forming of the lateral wall of the reinforcement with greater accuracy.

In the above embodiments, the height of the bead, measured from the base surface, is lower than the corresponding height of the welding projection. This arrangement prevents the anti-wrinkle bead from contacting the vehicle structural member, thereby preventing generation of noise due to the contact.

In the above embodiments, the bead and the welding projections are arranged at such intervals that the rounded transition from the bead to the base surface does not overlap the rounded transition from the welding projection to the base surface. This configuration effectively prevents or suppresses formation of wrinkles while ensuring the required strength during collisions.

In the above embodiments, the bead extends from the open side edge of the lateral wall toward the ridge line. However, the bead has a length smaller than the width of the lateral wall. This configuration allows for a narrowing of the intervals of adjacent welding projections.

Further, in the above embodiments, the welding projection in the curved section of the lateral wall has a height measured from the base surface. The height at the ridge line is zero and increases toward the raised welding surface. This configuration prevents cracks due to shrinkage during press forming.

While described with reference to specific embodiments, the present disclosure is not limited to these embodiments, and those skilled in the art can make various substitutions, improvements, and/or modifications without departing from the objective of the present invention.

The invention claimed is:

1. A reinforcement for a vehicle structural member, wherein the reinforcement is disposed in an interior space of the vehicle structural member having a closed cross section and is joined by welding to the vehicle structural member, the reinforcement comprising:
   a curved section formed in at least a part of a length of the reinforcement;
   a top wall having first and second edges opposite each other; and
   a first and second lateral wall extending respectively from the first and second edges of the top wall, the first edge forming a first ridge line between the top wall and the first lateral wall and the second edge forming a second ridge line between the top wall and the second lateral wall, wherein:
   the top wall and the first and second lateral walls form a U-shaped cross section,
   the first lateral wall includes:
      a base surface;
      a plurality of welding projections positioned along the length of the base surface, each welding projection having a raised surface for welding, wherein each welding projection is raised from the base surface of the first lateral wall toward the vehicle structural member; and
      a bead between the welding projections within the curved section,
   the bead is configured to prevent or suppress a wrinkle from forming during press forming,
   the bead is raised from the base surface of the first lateral wall toward the vehicle structural member, and the welding projections arranged within the curved section of the first lateral wall extend from the first ridge line and along the first lateral wall.

2. The reinforcement according to claim 1, wherein a height of the bead, measured from the base surface, is smaller than a height of both of the welding projections, measured from the base surface.

3. The reinforcement according to claim 1, wherein the bead and the welding projections are arranged such that a rounded transition from the bead to the base surface does not overlap a rounded transition from at least one of the welding projections to the base surface.

4. The reinforcement according to claim 1, wherein:
the bead extends from an open side edge of the first lateral wall toward the first ridge line, and
the bead has a length smaller than a width of the first lateral wall.

5. The reinforcement according to claim 1, wherein:
the welding projections arranged within the curved section of the first lateral wall each have a height measured from the base surface, and
the height of each of the welding projections is zero at the first ridge line and increases toward the raised surface.

6. The reinforcement according to claim 1, wherein the bead is configured to prevent or suppress the wrinkle from forming in the base surface of the first lateral wall.

7. The reinforcement according to claim 1, wherein the bead is spaced apart from the vehicle structural member.

8. A reinforcement for a vehicle structural member having a closed cross section, wherein the reinforcement is disposed in an interior space of the vehicle structural member and is joined by welding to the vehicle structural member, the reinforcement comprising:
a top wall formed in a curved section of the reinforcement; and
a first lateral wall extending from a first edge of the top wall, the edge forming a first ridge line between the top wall and the first lateral wall, wherein:
a first portion of the lateral wall in the curved section of the reinforcement forms a welding projection, the welding projection having a raised welding surface raised toward the vehicle structural member,
a second portion of the lateral wall in the curved section of the reinforcement forms a bead, the bead being raised toward the vehicle structural member, and
a height of the bead measured from a base surface of the first lateral wall is smaller than a height of the welding projecting measured from the base surface of the first lateral wall.

9. The reinforcement according to claim 8, wherein:
the bead is positioned adjacent the welding projection, and
the bead is spaced apart from the welding projection.

10. The reinforcement according to claim 8, wherein a distance between the welding projection and the first ridge line is less than the distance between the bead and the first ridge line.

11. The reinforcement according to claim 8, wherein a maximum width of the welding projection is larger than a maximum width of the bead.

12. The reinforcement according to claim 8, wherein a minimum width of the welding projection is larger than a minimum width of the bead.

13. The reinforcement according to claim 8, wherein a width of the bead nearest the first ridge line is less than a width of the bead furthest from the first ridge line.

14. The reinforcement according to claim 8, wherein:
an edge of the welding projection is aligned with an edge of the first lateral wall opposite the first ridge line, and
an edge of the bead is aligned with the edge of the first lateral wall opposite the first ridge line.

15. The reinforcement according to claim 14, wherein a height of the edge of the welding projection aligned with the edge of the first lateral wall measured from the base surface of the first lateral wall is larger than a height of the edge of the bead aligned with the edge of the first lateral wall as measured from the base surface of the first lateral wall.

16. The reinforcement according to claim 14, wherein a distance between the welding projection and the bead at the edge of the first lateral wall opposite the first ridge line is less than a distance between the welding projection and the bead at the first ridge line.

17. The reinforcement according to claim 8, wherein the base surface of the first lateral wall is positioned between the welding projection and the bead.

18. The reinforcement according to claim 17, wherein the base surface is non-undulating between the welding projection and the bead.

19. The reinforcement according to claim 8, wherein the welding projection in the curved section of the first lateral wall extends from the first ridge line.

20. The reinforcement according to claim 8, wherein:
the welding projection and the bead are arranged adjacent to each other, and
the welding projection and the bead are connected to each other by a continuously rounded transition section formed in the base surface of the first lateral wall.

* * * * *